Aug. 19, 1952     W. J. FITZPATRICK     2,607,380
SLITTING MACHINE
Filed July 27, 1948     3 Sheets-Sheet 3
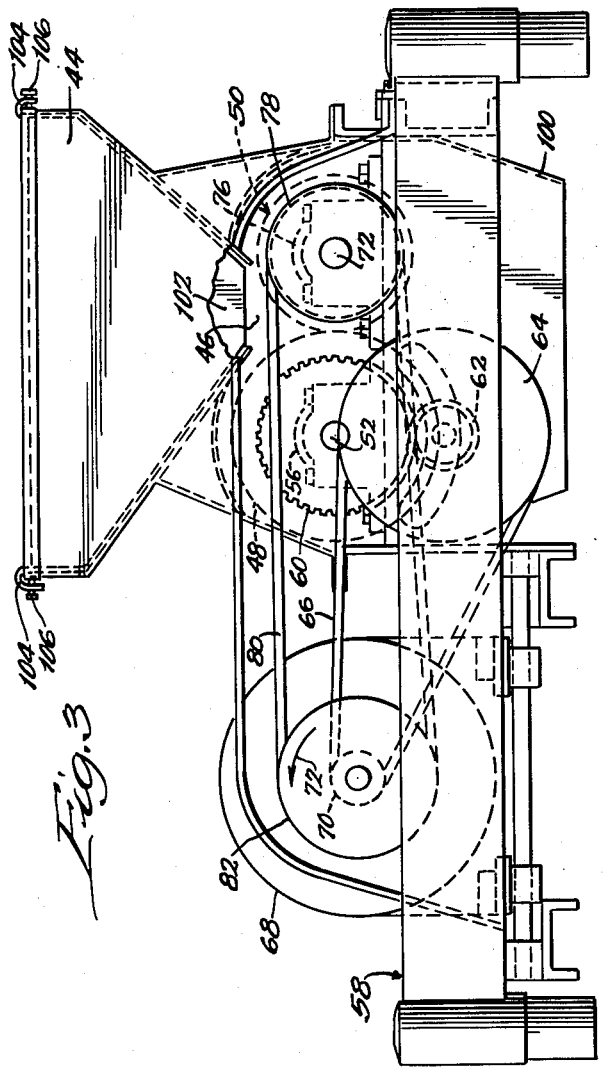
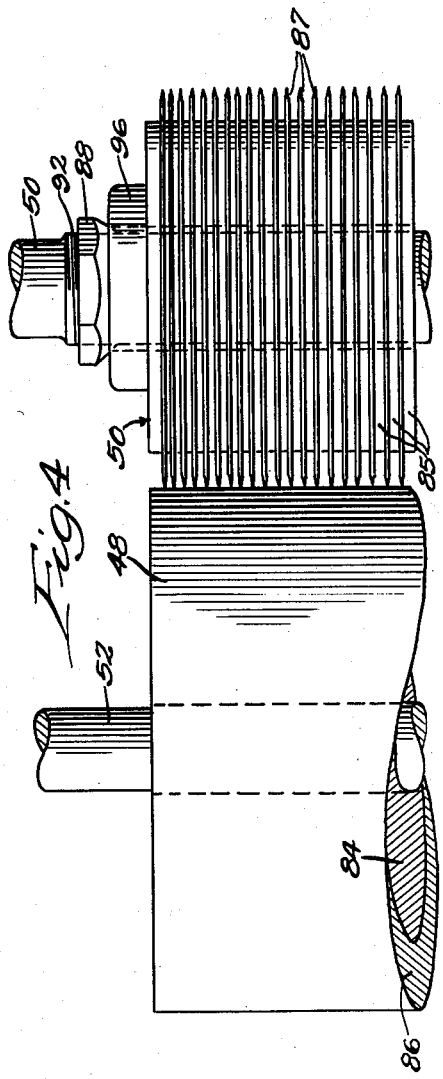
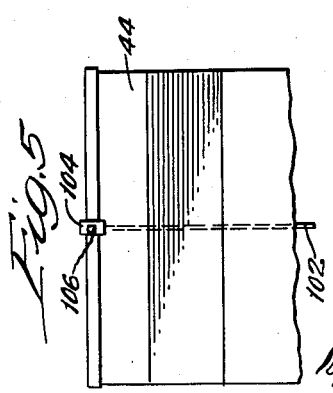

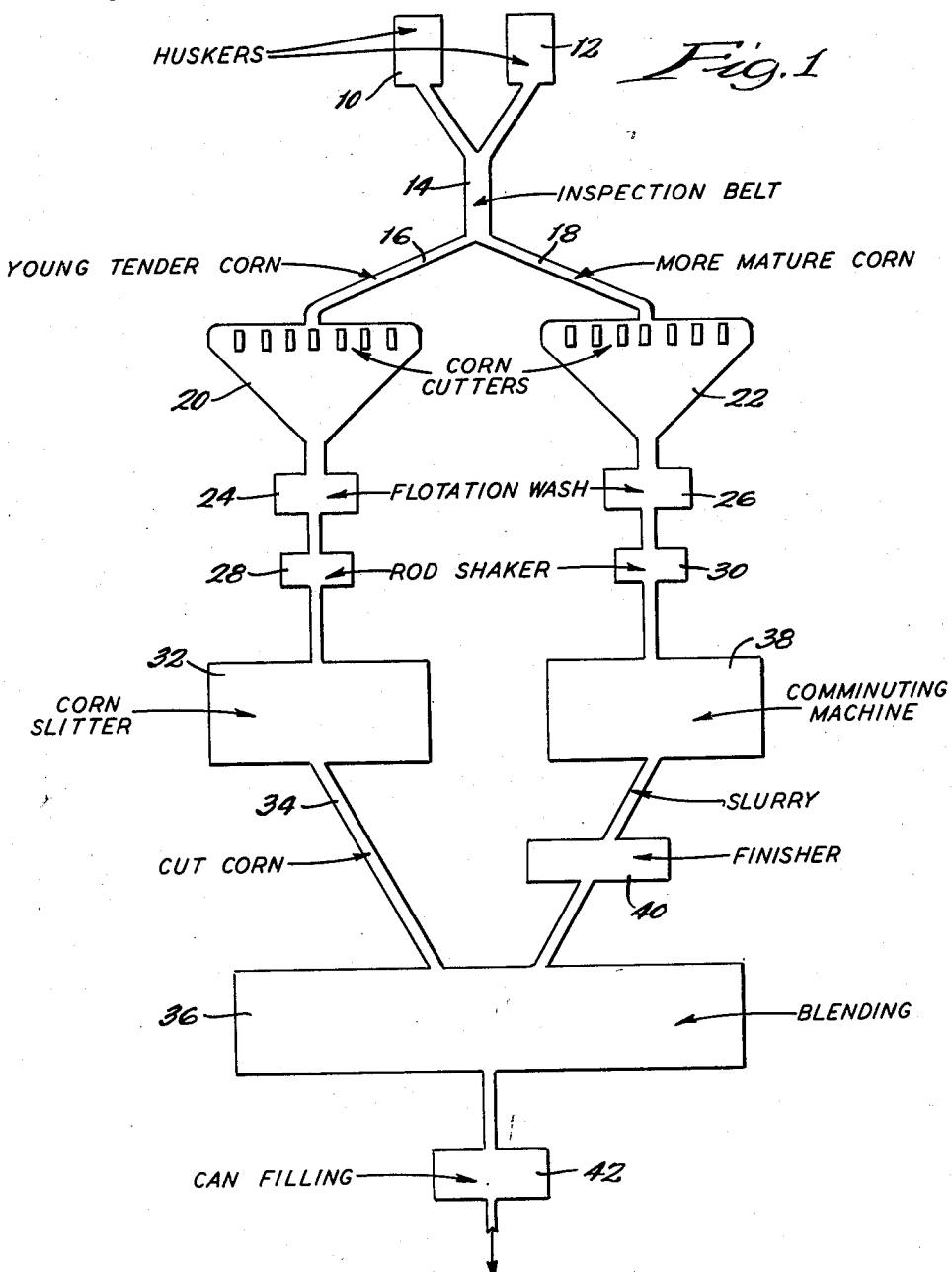

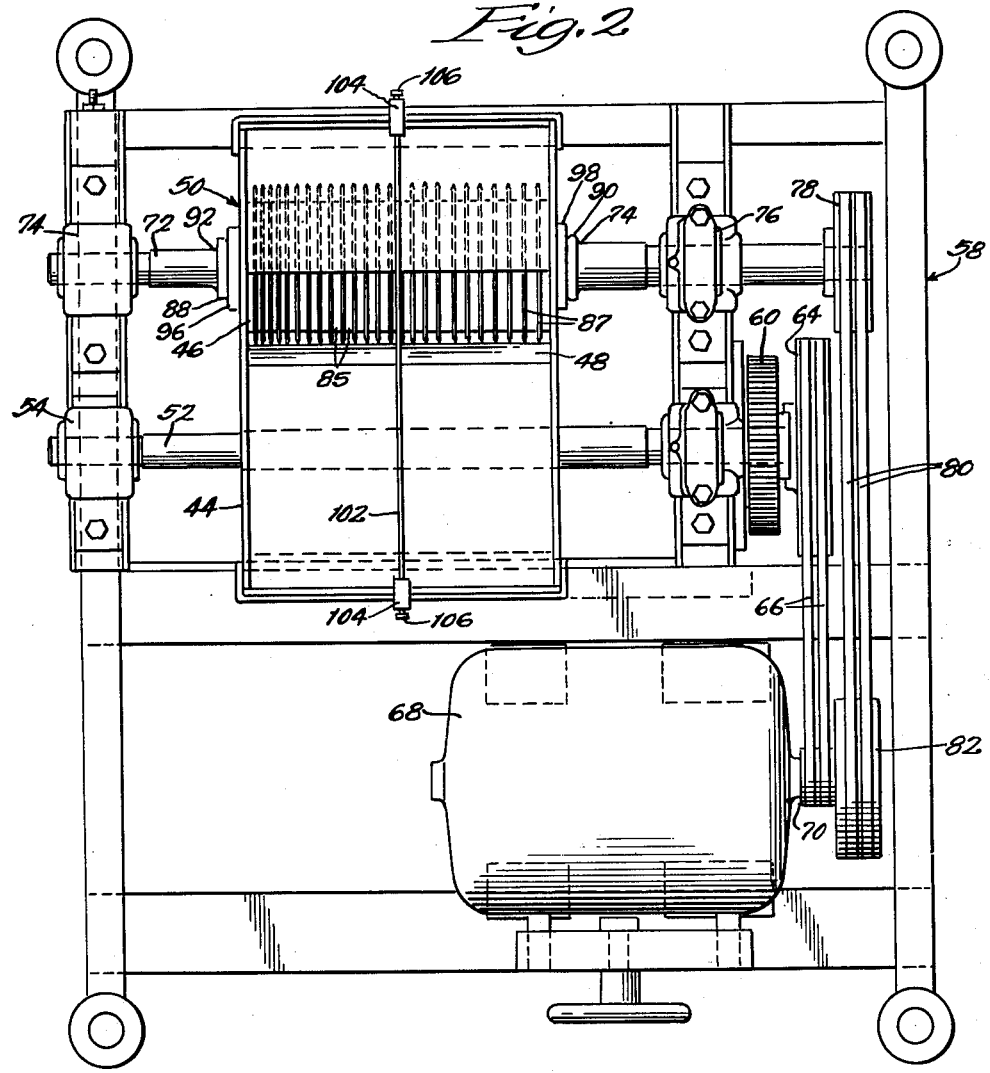

Patented Aug. 19, 1952

2,607,380

UNITED STATES PATENT OFFICE 2,607,380

SLITTING MACHINE

William John Fitzpatrick, Chicago, Ill., assignor to W. J. Fitzpatrick Company, Chicago, Ill., a corporation of Illinois Application July 27, 1948, Serial No. 40,896

2 Claims. (Cl. 146—98)

This invention relates to slitting machines and particularly to machines for slitting corn kernels in making cream style corn.

Cream style corn has heretofore been manufactured by cutting the husked corn in two stages. In the first stage, the kernels are cut off at a predetermined distance from the surface of the cob, thus producing a mass of cut kernels or nibs having sizes varying in accord with the size distribution of the kernels on the cobs and the setting of the knives. In the second stage, the roots of the cut kernels are scraped from the cob to produce a slurry or milky corn mixture. These two products are then blended to make the cream style corn.

Great difficulty has been encountered in the foregoing process because the second stage of operation introduces scraped off portions of corn borers, other infestations and foreign materials into the slurry with the consequence that the resulting cream style corn is polluted. Since the slurry is a homogenous mass it has thus far been impossible to remove practically the polluting material.

For the foregoing reasons, the only practical way to control pollution of cream style corn has been rigid inspection of the ears prior to cutting. This inspection is not entirely effective since infestations frequently exist in ears of corn having no readily visible imperfections. Moreover, this method results in loss of ears only partially destroyed by infestation.

According to the method in which the machine of the present invention is used, the kernels are cut whole from the cob and are cleaned to remove all infestations and foreign material. A portion of the kernels are comminuted to form a cream and the remainder are mixed with the cream to form the product. In this method it is desirable that at least a part of the kernels be slit to reduce the kernel size in the final product and the present invention has for its principal object the provision of a machine to perform this slitting operation.

Another object of the present invention is to provide a machine operable to slit corn kernels to varying sizes simulating the kernel sizes produced by presently existing methods of cream style corn manufacture.

Still another object of the present invention is to provide an improved machine for slitting corn kernels and which has features of construction, combination, and arrangement rendering it simple in construction and reliable and effective in operation to the end that it be particularly suitable for use in the manufacture of corn products.

Another object of the present invention is to provide an improved machine for slitting kernels of corn and which includes adjustable elements to vary the size of the particles produced thereby.

The novel features which I believe to be characteristic of my invention are set forth with particularity in the appended claims. My invention, itself, however, both as to the steps of the process and the structure and operation of the machine, may best be understood by reference to the following description taken in connection with the accompanying drawings, in which:

Figure 1 is a flow chart diagrammatically illustrating a process with which the machine of the present invention is used;

Figure 2 is a top plan view of the corn slitting machine of the present invention;

Figure 3 is a side elevational view of the machine of the present invention;

Figure 4 is an enlarged fragmentary top plan view of the machine of the present invention;

Figure 5 is a fragmentary end elevational view of the machine of the present invention.

Figure 1 is a flow diagram illustrating the manufacture of corn in accordance with the process of the present invention. Ears of corn are first applied to the huskers 10 and 12 which continuously remove the husks therefrom and deliver the husked ears to the inspection belt 14.

The inspection belt 14 travels at relatively low speed to permit inspectors to observe the condition of the ears of corn and remove any obviously defective ears. Since this inspection is limited to defects observable as the belt travels, it is superficial and fails to remove ears having small or internal defects such as might be due to limited corn borer infection.

The ears on belt 14 are segregated in accordance with their size and age, the ears of young tender corn being placed on belt 16 and the ears of more mature corn being placed on belt 18. These separate components of the corn are then treated individually as described hereafter.

The young tender corn is sufficiently young and tender to produce palatable tender whole kernels. The more mature corn comprises the ears having larger, tougher kernels that would not form a palatable component of the cream style corn if in whole kernel form.

The ears of corn on conveyors 16 and 18 are fed to separate sets of corn cutters 20 and 22. These cutters include elements continuously operative to cut the corn kernels at their base portions, thereby separating whole kernels from the ears and forming a mass of whole kernels.

The masses of whole kernels from cutters 20 and 22 are delivered to the flotation washers 24 and 26 respectively. In these washers the kernels are washed in a bath of water where any form of infestation tends to rise to the top of the washing tank where it may be removed separately from the kernels.

Following the flotation wash, the kernels travel to rod shakers 28 and 30. These subject the kernels to vibratory forces which remove surplus moisture and tend to shake out any worms that may not have been removed in the flotation tank.

It will be observed that both the flotation tank and rod shaker operate on the mass of separated kernels and do not rely on visible imperfections for removal of the contamination. Moreover, each of these is effective to remove contaminations from kernels of corn without rejecting other sound kernels of the same ear.

The young tender kernels, upon leaving the rod shaker 28, are received by the corn slitter indicated at 32. The structure of this machine is described in detail hereafter. Briefly it includes knives operable to cut the kernels of young, tender corn to varying sizes in accord with the size distribution desired in the kernels of cream style corn. The resultant cut corn is applied to conveyor 34 from which it travels to the blending equipment 36.

The more mature corn, upon leaving the rod shaker 30, is received by the comminuting machine 38. This machine breaks down these kernels to a small size to form a milky slurry of corn fluid and particles of kernels. If desired, excess hulls may be removed in the finisher 40. The resultant slurry is then conveyed to the blending equipment 36.

In blending equipment 36, the slurry and the cut young tender kernels are mixed in proportions to give a resultant mixture simulating that achieved by conventional processes. The blended mixture then travels to can filling equipment 42 where it is canned as cream style corn.

While the product produced by the foregoing process superficially resembles cream style corn prepared in the conventional manner and may be so marketed and sold, it differs materially from conventional cream style corn and is in reality an improved quality cream style corn. In the corn produced in accord with the present process, the nibs or cut up kernels are from the young tender corn and generally constitute more nearly the entire kernels than do the nibs of conventional cream style corn. This results in a more palatable and attractive product than conventional cream style corn since the nibs of more nearly whole kernels of young tender corn are far more desirable than nibs of small portions of more mature corn. However, since the more mature corn forms an effective slurry, the process of the present invention does not waste this corn but instead uses it for the purpose in which it is most suitable, thus increasing the yield of the process.

Moreover, the larger particles in cream style corn manufactured by existing processes are the particles of more mature corn and the young tender corn tends to contribute to the slurry. This is in contrast to the present process in which young tender corn makes up the particles and the more mature corn makes the slurry.

The construction of a corn slitter particularly suitable for use as slitter 32 in the above-described process is shown in Figures 2, 3, and 4. As is best seen in Figure 3, this machine includes a hopper 44 formed in the shape of a funnel and having an outlet opening 46 adjacent the nip defined by horizontal parallel rolls 48 and 50.

Roll 48 is mounted on shaft 52 which in turn is supported by ball bearings 54 and 56 of frame 58. A bull gear 60 is received on one end of shaft 52 and is in mating engagement with pinion gear 62 as shown in Figure 3. Sheave 64 is mounted for rotation with pinion gear 62 and receives the V-belts 66. The entire assembly is driven by motor 68 which rotates pulley 70.

The motor 68 rotates pulley 70 in the counterclockwise direction as indicated by arrow 72, Figure 3, thereby rotating roll 48 in the clockwise direction to tend to urge corn kernels downwardly from hopper 44.

The roller 50 is received on shaft 72 which in turn is supported from frame 58 by ball bearings 74 and 76. The sheave 78 is also mounted on this shaft and receives V-belts 80. The V-belts 80, and hence roller 50, are driven in the counterclockwise direction (Figure 3) by motor 68 to which is attached pulley 82.

The construction of rollers 48 and 50 is best shown in the enlarged fragmentary view of Figure 4. As indicated, roller 48 comprises an inner cylindrical portion 84 of steel or similar material covered by a yieldable tire 86 of neoprene or similar rubber-like material.

The roller 50 comprises a series of washers 85 separated by knife disks 87. The complete assembly is held under axial pressure by the conical wedges 88 and 90 which are received on suitable threaded portions 92 and 94 of the shaft 50. End washers 96 and 98 are interposed between each wedge and the adjacent washer 87.

The disks 87 are of uniform diameter and concentrically mounted on shaft 50. The bearings 74 and 76 hold this shaft parallel to the shaft 52 and spaced therefrom by a distance to give a very slight pressure between these disks and the face of roller 48.

It will be observed that rolls 48 and 50 both rotate in direction to urge kernels in hopper 44 into the nip defined thereby. However, roller 50 rotates at considerably greater velocity than does roller 48 with the consequence that the knife disks 87 slide relative to the periphery of tire 86 and particularly effective cutting action is achieved.

Upon passing through the nip defined by rolls 48 and 50, the kernels are discharged through chute 100 to a suitable receptacle or conveyor (not shown) located below that chute.

The washers or spacers 85 are of various thicknesses to space disk knives 87 as required to cut the kernels of young tender corn in the desired size distribution. This variation is shown to an exaggerated degree in Figure 4.

It is the function of the shiftable guide 102 to control the size of the particles of corn, formed by the machine of Figures 2 to 5. This guide comprises a sheet metal plate shaped to conform to the shape of hopper 44 and having overhanging lips 104 which receive set screws 106 to anchor the guide in position.

The corn is fed to the hopper 44 from one side of the guide 102, thus enabling that guide to control the axial portion of the rollers 48 and 50 at which the corn passes through the machine. Hence as the guide 102 is shifted the average kernel size from the machine is increased or decreased as desired.

If desired, a second guide 102 (not shown) may be provided and the corn fed between the guides.

The control achieved by guide 102 permits accommodation of the machine of the present invention to various conditions. If the corn available is predominately tough, the guide 102 may be shifted to cause the corn to tend to pass between the closely spaced knives 87. On the contrary, if the corn is predominately tender, guide 102 may be shifted to tend to cause it to travel between the more widely spaced knives 87. In this fashion, variations in the apparent creaminess of corn due to the toughness of the particles can be overcome.

Moreover, I have discovered that inhabitants of different geographical areas have different preferences regarding the degree of creaminess of cream style corn. The swingable guide 102 provides a means of adjusting the operation of the machine to take these preferences into account, thereby producing a more desirable product.

While I have shown and described only a single process and a single machine embodying the present invention, it will, of course, be understood that various modifications of the process and alternative constructions of the machine may be used without departing from the spirit and scope of my invention. I therefore intend by the appended claims to cover all such modifications and alternative constructions as fall within the true spirit and scope of my invention.

What I claim as new and desire to secure by Letters Patent of the United States is:

1. A machine for slitting corn kernels, said machine comprising a first roller having a yieldable tire, a second roller having a plurality of axially spaced concentric disk knives for coaction with said first roller to slit corn kernels therebetween, said knives being spaced progressively varying axial distances throughout the length of the second roller, means to rotate said rollers to force said kernels therebetween, a hopper to guide said kernels into the nip between said rollers, and a movable guide member in said hopper selectively to deflect said kernels to selected portions of the lengths of the rollers.

2. A machine for slitting corn kernels to various sizes suitable for cream style corn comprising a pair of rollers rotatable on parallel horizontally spaced axes, one of the rollers having a plurality of axially spaced disc knives running in contact with the surface of the other roller and spaced progressively varying axial distances from each other throughout the length of the rollers, means to drive the rollers in a direction such that their meeting surfaces move downward, a hopper above the rollers formed with an elongated discharge opening above and parallel to the roller axes, and a shiftable guide plate in the hopper conforming substantially to the shape thereof and shiftable along the length of the outlet opening to direct corn kernels to selected portions of the lengths of the rollers.

WILLIAM JOHN FITZPATRICK.

REFERENCES CITED

The following references are of record in the file of this patent:

UNITED STATES PATENTS

| Number | Name | Date |
| --- | --- | --- |
| 115,987 | Siemers | June 13, 1871 |
| 692,940 | Stare | Feb. 11, 1902 |
| 739,817 | Berchtold | Sept. 29, 1903 |
| 1,477,502 | Killick | Dec. 11, 1923 |
| 2,000,892 | Lewis | May 7, 1935 |
| 2,114,020 | Froney | Apr. 12, 1938 |
| 2,131,851 | Anstice | Oct. 4, 1938 |
| 2,349,212 | Urschel et al. | May 16, 1944 |
| 2,360,728 | Spang | Oct. 17, 1944 |
| 2,406,107 | Quinn | Aug. 20, 1946 |